US006989123B2

(12) United States Patent
Lee et al.

(10) Patent No.: US 6,989,123 B2
(45) Date of Patent: Jan. 24, 2006

(54) METHODS TO PRODUCE GEL SHEETS

(75) Inventors: Kang P. Lee, Sudbury, MA (US); George L. Gould, Mendon, MA (US); William Gronemeyer, Wilmington, MA (US); Christopher John Stepanian, Somerville, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

(21) Appl. No.: 11/061,037

(22) Filed: Feb. 18, 2005

(65) Prior Publication Data

US 2005/0167891 A1 Aug. 4, 2005

Related U.S. Application Data

(62) Division of application No. 10/876,103, filed on Jun. 23, 2004.

(60) Provisional application No. 60/482,359, filed on Jun. 24, 2003, now abandoned.

(51) Int. Cl.
*B29C 39/00* (2006.01)
*B29C 39/18* (2006.01)

(52) U.S. Cl. ....................... 264/299; 264/308; 264/212

(58) Field of Classification Search ..................... None
See application file for complete search history.

(56) References Cited

U.S. PATENT DOCUMENTS

| | | | |
|---|---|---|---|
| 3,434,912 A | 3/1969 | Peri | |
| 5,242,647 A | 9/1993 | Poco | |
| 5,306,555 A | 4/1994 | Ramamurthi et al. | |
| 5,731,360 A | 3/1998 | Pekala et al. | |
| 6,068,882 A | 5/2000 | Ryu | |
| 6,168,737 B1 | 1/2001 | Poco et al. | |
| 6,187,250 B1 | 2/2001 | Champagne | |
| 6,598,283 B2 | 7/2003 | Rouanet et al. | |
| 6,696,258 B1 * | 2/2004 | Wei et al. | 435/7.2 |
| 2002/0094426 A1 | 7/2002 | Stepanian et al. | |

* cited by examiner

*Primary Examiner*—Michael P. Colaianni
*Assistant Examiner*—Monica A. Huson
(74) *Attorney, Agent, or Firm*—Steven M. Jensen; Edwards & Angell, LLP

(57) ABSTRACT

The present invention provides various methods for producing gel sheets in a continuous fashion. The embodiments of the present invention help reduce the time of producing gel sheets that is suitable for industrial manufacturing. Such gel sheets are used in manufacturing aerogel blankets used in a variety of applications including thermal and acoustic insulation.

20 Claims, 7 Drawing Sheets

METHODS TO PRODUCE GEL SHEETS

CROSS REFERENCE TO RELATED APPLICATIONS

This application claims priority from, and incorporates by reference the entirety of pending U.S. patent application Ser. No. 10/876,103, which was filed on Jun. 23, 2004, and which claimed priority from, and incorporated by reference the entirety of U.S. Provisional Patent Application Ser. No. 60/482,359, which was filed on Jun. 24, 2003, and which is now abandoned.

BACKGROUND OF THE INVENTION

1. Field of the Invention

This invention relates to the preparation of solvent filled gel sheets in a continuous fashion. Such gel sheets are used in manufacturing aerogel blankets, aerogel composites, aerogel monoliths and other aerogel based products.

2. Description of Related Art

Aerogels describe a class of material based upon their structure, namely low density, open cell structures, large surface areas (often 900 m2/g or higher) and sub-nanometer scale pore sizes. Supercritical and subcritical fluid extraction technologies are commonly used to extract the fluid from the fragile cells of the material. A variety of different aerogel compositions are known and may be inorganic or organic. Inorganic aerogels are generally based upon metal alkoxides and include materials such as silica, carbides, and alumina. Organic aerogels include, but are not limited to, urethane aerogels, resorcinol formaldehyde aerogels, and polyimide aerogels.

Low-density aerogel materials (0.01–0.3 g/cc) are widely considered to be the best solid thermal insulators, better than the best rigid foams with thermal conductivities of 10–15 mW/m-K and below at 100° F. and atmospheric pressure. Aerogels function as thermal insulators primarily by minimizing conduction (low density, tortuous path for heat transfer through the solid nanostructure), convection (very small pore sizes minimize convection), and radiation (IR absorbing or scattering dopants are readily dispersed throughout the aerogel matrix). Depending on the formulation, they can function well at cryogenic temperatures to 550° C. and above. Aerogel materials also display many other interesting acoustic, optical, mechanical, and chemical properties that make them abundantly useful.

Low-density insulating materials have been developed to solve a number of thermal isolation problems in applications in which the core insulation experiences significant compressive forces. For instance, polymeric materials have been compounded with hollow glass microspheres to create syntactic foams, which are typically very stiff, compression resistant materials. Syntactic materials are well known as insulators for underwater oil and gas pipelines and support equipment. Syntactic materials are relatively inflexible and of high thermal conductivity relative to flexible aerogel composites (aerogel matrices reinforced by fiber). Aerogels can be formed from flexible gel precursors. Various flexible layers, including flexible fiber-reinforced aerogels, can be readily combined and shaped to give pre-forms that when mechanically compressed along one or more axes, give compressively strong bodies along any of those axes. Aerogel bodies that are compressed in this manner exhibit much better thermal insulation values than syntactic foams. Methods to produce these materials rapidly will facilitate large-scale use of these materials in underwater oil and gas pipelines as external insulation.

Conventional methods for gel sheet and/or fiber-reinforced composite gel sheet production formed via sol-gel chemistry described in the patent and scientific literature invariably involve batch casting. Batch casting is defined here as catalyzing one entire volume of sol to induce gelation simultaneously throughout that volume. Gel-forming techniques are well-known to those trained in the art: examples include adjusting the pH and/or temperature of a dilute metal oxide sol to a point where gelation occurs (R. K. Iler, Colloid Chemistry of Silica and Silicates, 1954, chapter 6; R. K. Iler, The Chemistry of Silica, 1979, chapter 5, C. J. Brinker and G. W. Scherer, Sol-Gel Science, 1990, chapters 2 and 3).

U.S. Pat. No. 6,068,882 (Ryu) discloses an example of a fiber-reinforced aerogel composite material that can be practiced with the embodiments of the present invention. The preferred aerogel composite precursor materials used in the present invention are those like Cryogel®, Pyrogel®, or Spaceloft™ sold commercially by Aspen Aerogels, Incorporated. U.S. Pat. No. 5,306,555 (Ramamurthi et al.) discloses an aerogel matrix composite of a bulk aerogel with fibers dispersed within the bulk aerogel and a method for preparing the aerogel matrix composite.

SUMMARY OF THE INVENTION

This invention describes continuous and semi-continuous sol-gel casting methods that are greatly improved over conventional batch sol-gel casting methods for gel sheets, fiber-reinforced flexible gel sheets, and rolls of composite gel materials.

More specifically, the invention describes methods for continuously combining a low viscosity solution of a sol and an agent (heat catalyst or chemical catalyst) that induces gel formation and forming a gel sheet on a moving element such as a conveyer belt with edges that defines the volume of the formed gel sheet by dispensing the catalyzed sol at a predetermined rate effective to allow gelation to occuer on the moving element. The sol includes an inorganic, organic or a combination of inorganic/organic hybrid materials. The inorganic materials include zirconia, yttria, hafnia, alumina, titania, ceria, and silica, magnesium oxide, calcium oxide, magnesium fluoride, calcium fluoride, and any combinations of the above. Organic materials include polyacrylates, polyolefins, polystyrenes, polyacrylonitriles, polyurethanes, polyimides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, agarose and any combinations of the above. Even more specifically, the methods describe the formation of monolithic gel sheets or fiber-reinforced gel composite having two parts, namely reinforcing fibers and a gel matrix wherein the reinforcing fibers are in the form of a lofty fibrous structure (i.e. batting), preferably based upon either thermoplastic polyester or silica fibers, and more preferably in combination with individual randomly distributed short fibers (microfibers) in a continuous or semi-continuous fashion. The fibrous batting or mat material is introduced onto the moving element for combination with the catalyzed sol prior to gelation.

Moreover, when a gel matrix is reinforced by a lofty batting material, particularly a continuous non-woven batting comprised of very low denier fibers, the resulting composite material when dried into an aerogel or xerogel product by solvent extraction, maintains similar thermal properties to a monolithic aerogel or xerogel in a much stronger, more durable form. The diameter of the fibers used is in the range of 0.1–10,000 microns. In some cases the fiber batting, crimped fibers can be distributed throughout the gel structure.

Even more specifically, the methods describe methods to continuously or semi-continuously form gel composites by introduction of an energy dissipation zone on the moving conveyor apparatus. The gelation of the catalyzed sol can be enhanced by chemical or energy dissipation process. For instance, a controlled flux of electromagnetic (ultraviolet, visible, infrared, microwave), acoustic (ultrasound), or particle radiation can be introduced across the width of a moving sol volume contained by a conveyor belt to induce sufficient cross-linking of the polymers contained within the sol to achieve a gel point. The flux, the point and the area of radiation can be controlled along the conveyance apparatus to achieve an optimized casting rate and desirable gel properties by the time the terminus of the conveyor is reached for a given section of gel. In this fashion, gel properties can be controlled in a novel fashion to a degree not possible with batch casting methods. In addition, another moving element rotating in the opposite direction to the first moving element can be used to provide the shape of the top portion of the gel sheets.

Still more specifically, a roll of gel composite material that is co-wound or corolled with a porous flow layer that facilitates solvent extraction using supercritical fluids processing methods can be formed in a very small footprint using the method of the present invention. This is accomplished via infusing a predetermined amount of catalyzed sol in a rolled fiber-preform co-rolled with an impermeable spacer layer, geling the infused roll, followed by un-rolling the gel composite article, removing the impermeable layer, and re-rolling of the incompletely cured body flexible gel composite with a porous spacer layer. The method described in this invention provides great advantage in enhancing the rate of production of gel composite materials in as small an area as possible.

Still more specifically, a method for producing gel sheets in a continuous fashion is described in which gel sheets are produced by any one of the above mentioned methods and are rolled into a plurality of layers. This is a novel and effective way of producing gel sheets for efficient drying operations. In another feature, an optional spacer material is co-rolled with the gel sheets. Such a spacer material can be permeable or impermeable in nature. Depending on the permeability of the spacer material, one can obtain a favorable flow pattern in a subsequent drying. Spacer material also provides flow paths for subsequent silation (aging) fluids to easily pass through. In the drying they further help by proving flow paths that effectively reduce the thickness of the gel sheet to be extracted in in radial direction.

These and still further embodiments of the present invention are described in greater detail below. The advantages of the methods described in this invention for processing monolith and fiber-reinforced composite sheets in a continuous or semi-continuous fashion over previously described methods are many. For instance, the gel articles can be fashioned continuously or semi-continuously provided all components are fed into the apparatus at the appropriate rate. Thus, large volumes of material can be fashioned in a smaller production area than with traditional batch casting requiring molds that must be filled and allowed to set for aging prior to solvent extraction to make aerogel or xerogel materials. Very long continuous sheets of fiber-reinforced, flexible gel material are readily fashioned using the methods of this invention because of the combined casting and rolling processing allows a single molding surface to be continuously re-utilized within a small production area. When rolls of gel are cast batchwise followed by roll-to-roll processing to place porous flow layers between layers of gel material, the production footprint is diminished even further, increasing production capacity and potentially lowering production costs relative to flat sheet batch casting.

DETAILED DESCRIPTION OF THE INVENTION

Figure 1:
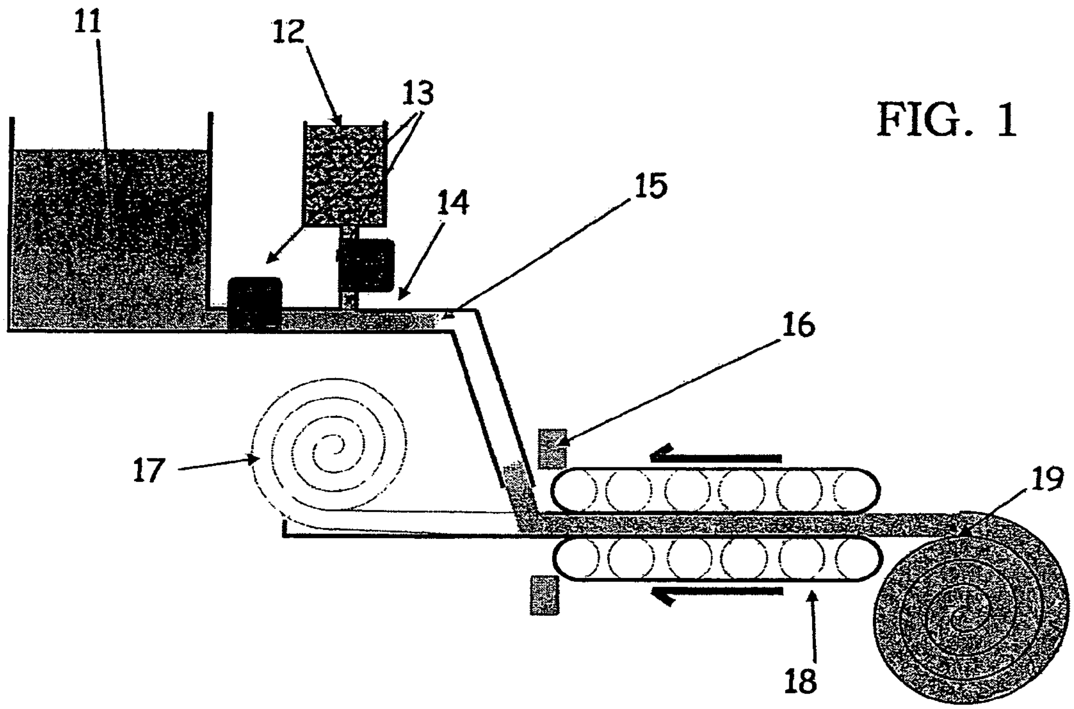
FIG. 1 illustrates a method of producing fiber reinforced gel sheets using a counter rotating conveyor belt.

The invention(s) described herein are directed to producing solvent filled, nanostructured gel monolith and flexible blanket composite sheet materials. These materials give nanoporous aerogel bodies after all mobile phase solvents are extracted using a hypercritical solvent extraction (supercritical fluid drying). For instance, the processes described in this invention will offer significantly better production capacities for forming monolithic gel sheets or rolled gel composite articles in a form factor that will facilitate removal of solvent in a subsequent supercritical fluids extraction procedure. The first method outlines a conveyor-based system that utilizes delivery of a low viscosity, catalyzed sol mixture at one end and a system to cut and convey formed monolithic (defined here as polymer or ceramic solid matrix only, no fibers added) sheets of solvent filled gel material into a system for further chemical treatment. The second method describes a conveyor-based system that utilizes delivery of a catalyzed sol mixture of low viscosity at one end and a system to cut and convey solvent-filled, fiber-reinforced gel composite sheets into a rolling system (with and without a porous separator flow layer) to produce a form factor ready for further treatment prior to supercritical fluid extraction. The third method describes a direct roll-to-roll transfer process between two canisters in which the first hosts a direct "gel in a roll" reaction followed by unrolling and re-rolling the gel with a porous separator flow layer to prepare the form factor for further treatment prior to supercritical extraction. The three methods may be used in conjunction with controlled energy delivery methods to facilitate the timing of gelation and the strength of the green bodies formed. Energy in the form of ultrasound, heat, and various forms of radiation can be used to induce gelation from a prepared sol mixture in addition to classical methods of chemical catalysis (such as in a pH change from a stable sol pH to one that facilitates gelation.

The matrix materials described in this invention are best derived from sol-gel processing, preferably composed of polymers (inorganic, organic, or inorganic/organic hybrid) that define a structure with very small pores (on the order of billionths of a meter). Fibrous materials added prior to the point of polymer gelation reinforce the matrix materials described in this invention. The preferred fiber reinforcement is preferably a lofty fibrous structure (batting or web), but may also include individual randomly oriented short microfibers, and woven or non-woven fibers. More particularly, preferred fiber reinforcements are based upon either organic (e.g. thermoplastic polyester, high strength carbon, aramid, high strength oriented polyethylene), low-temperature inorganic (various metal oxide glasses such as E-glass), or refractory (e.g. silica, alumina, aluminum phosphate, aluminosilicate, etc.) fibers. The thickness or diameter of the fiber used in the embodiments of the present invention is in the range of 0.1 to 10,000 micron, and preferably in the range of 0.1 to 100 micron. In another preferred embodiment nanostructures fibers as small as 0.001 micron are used to reinforce the gel. Typical examples include carbon nanofibers and carbon nanotubes with diameters as small as 0.001 microns. Solvent filled gel sheets combining a ceramic solid (e.g. silica) and a mobile solvent phase (e.g. ethanol) can be formed on a conveyor by continuous injection of a catalyst phase into a sol phase and dispersing the catalyzed mixture onto a moving conveyor. Such materials will find use in insulating transparencies, such as double-glazing windows in buildings. Because these gel materials are normally stiff and inflexible when they are composed of a ceramic or cross-linked polymer matrix material with intercalated solvent (gel solvent) in the absence of fiber reinforcement, these materials need to be handled as molded if they are continuously cast. If the conveyor has molded edges that retain volume, then the gel can be directly cast onto the conveyor surface. If the conveyor has molds placed upon it, then the mold volumes can be continuously filled with freshly catalyzed sol.

Suitable materials for forming inorganic aerogels are oxides of most of the metals that can form oxides, such as silicon, aluminum, titanium, zirconium, hafnium, yttrium, vanadium, and the like. Particularly preferred are gels formed primarily from alcohol solutions of hydrolyzed silicate esters due to their ready availability and low cost (alcogel). Organic aerogels can be made from polyacrylates, polystyrenes, polyacrylonitriles, polyurethanes, poly-imides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, agarose, and the like (see for instance C. S. Ashley, C. J. Brinker and D. M. Smith, Journal of Non-Crystalline Solids, volume 285, 2001).

In one preferred embodiment of the methods of this invention, energy dissipation through a portion of the sol volume is utilized in a specific location of a conveyor apparatus utilized for the gel casting. By controlling the area of the catalyzed sol that is exposed to heat or specific flux of radiation (e.g. ultrasonic, x-ray, electron beam, ultraviolet, visible, infrared, microwave, gamma ray), a gelation phenomenon can be induced at a given point of a conveyor apparatus. It is advantageous to control the timing of the gelation point with respect to the conveyor speed such that the material has adequate time to age and strengthen prior to any mechanical manipulation at the terminus of the conveyor apparatus. Although the diffusion of polymer chains and subsequent solid network growth are significantly slowed within the viscous gel structure after the gelation point, the maintenance of the original gel liquid (mother liquor) for a period of time after gelation is essential to obtaining an aerogel that has the best thermal and mechanical properties. This period of time that the gel "ages" without disturbance is called "syneresis". Syneresis conditions (time, temperature, pH, solid concentration) are important to the aerogel product quality.

Gels are a class of materials formed by entraining a mobile interstitial solvent phase within the pores of a solid structure. The solid structures can be composed of inorganic, organic or inorganic/organic hybrid polymer materials that develop a pore morphology in direct relation to the method of gelation, solvent-polymer interactions, rate of polymerization and cross-linking, solid content, catalyst content, temperature and a number of other factors. It is preferred that gel materials are formed from precursor materials, including various fiber-reinforcement materials that lend flexibility to the formed composite, in a continuous or semi-continuous fashion in the form of sheets or rolls of sheets such that the interstitial solvent phase can be readily removed by supercritical fluids extraction to make an aerogel material. By keeping the solvent phase above the critical pressure and temperature during the entire, or at minimum the end of the solvent extraction process, strong capillary forces generated by liquid evaporation from very small pores that cause shrinkage and pore collapse are not realized. Aerogels typically have low bulk densities (about 0.15 g/cc or less, preferably about 0.03 to 0.3 g/cc), very high surface areas (generally from about 300 to 1,000 m2/g and higher, preferably about 700 to 1000 m2/g), high porosity (about 90% and greater, preferably greater than about 95%), and relatively large pore volume (about 3 mL/g, preferably about 3.5 mL/g and higher). The combination of these properties in an amorphous structure gives the lowest thermal conductivity values (9 to 16 mW/m-K at 37° C. and 1 atmosphere of pressure) for any coherent solid material.

Figure 2:
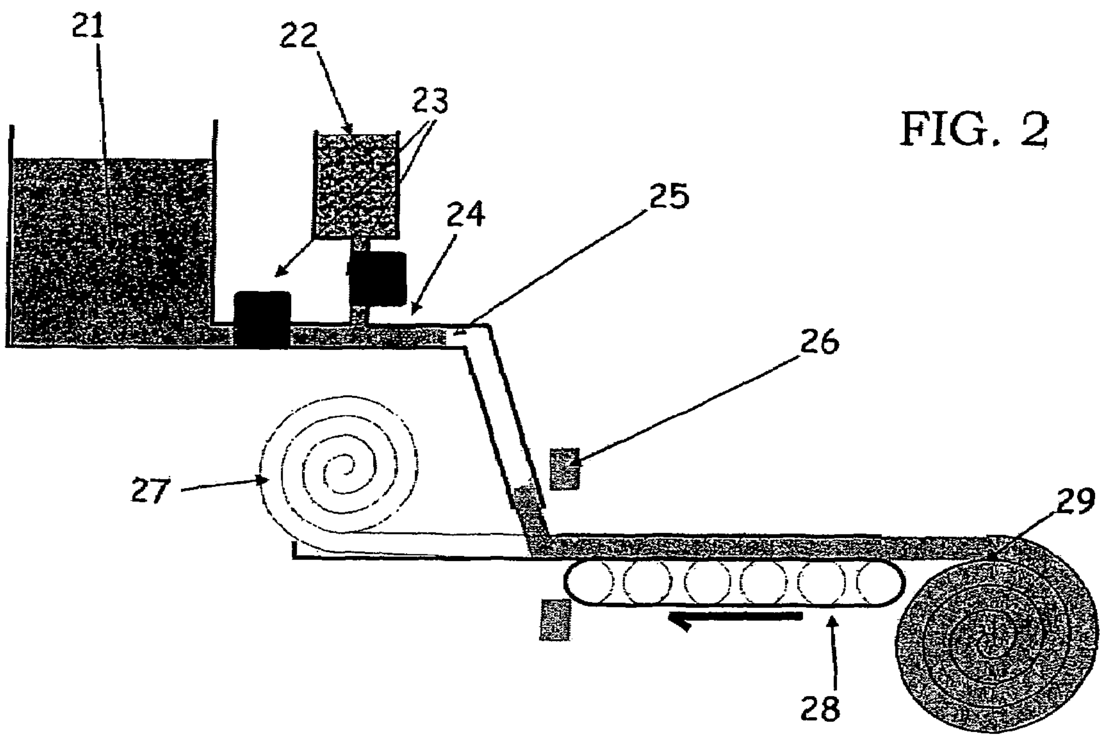
FIG. 2 illustrates a method of producing fiber reinforced gel sheets using a single rotating conveyor belt.
Figure 3:
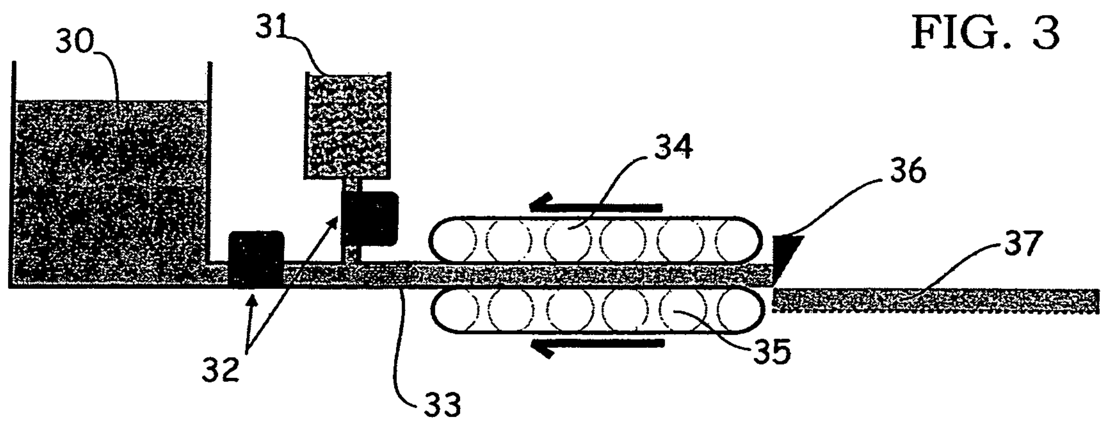
FIG. 3 illustrates a method of producing fiber reinforced gel sheets using a counter rotating conveyor belt with additional cutting.
Figure 4:
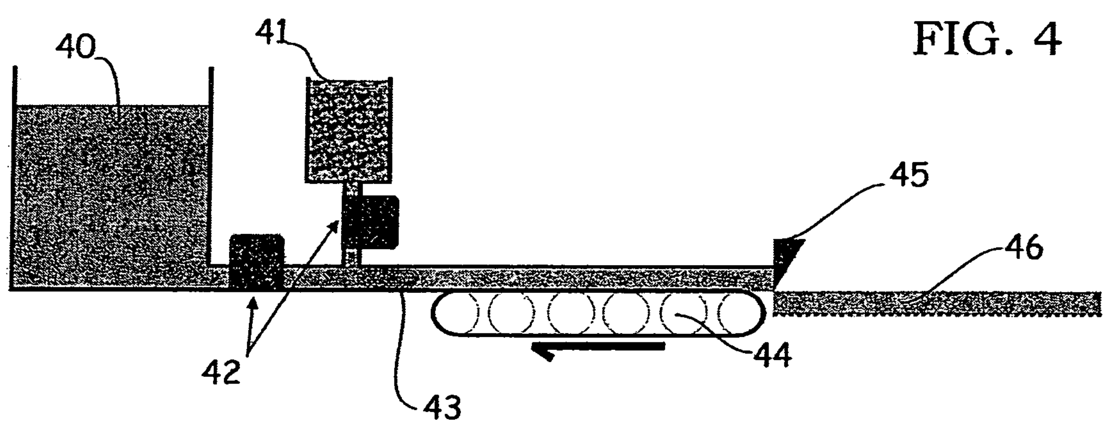
FIG. 4 illustrates a method of producing fiber reinforced gel sheets using a single rotating conveyor belt with additional cutting.

The monolithic and composite gel material casting methods described in the present invention comprise three distinct phases. The first is blending all constituent components (solid precursor, dopants, additives) into a low-viscosity sol that can be dispensed in a continuous fashion. The second involves dispensing the blended sol onto a moving conveyor mold that may also have a synchronized counter-rotating top belt to form a molded upper surface. The second phase may also include introduction of heat or radiation to the ungelled sol within a defined area of the moving conveyor apparatus to either induce gelation or modify the properties of the gel such as gel modulus, tensile strength, or density. The third phase of the invention process involves gel cutting and conveyance of monolithic gel sheets to a post-processing area or co-rolling a flexible, fiber-reinforced gel composite with a flexible, porous flow layer to generate a particularly preferred form factor of the material. The formed rolls of gel composite material and flow layer are particularly amenable to interstitial solvent removal using supercritical processing methods. An example of the preferred gel casting method is shown in FIG. 1, which utilizes a conventional chemically catalyzed sol-gel process in combination with a moving conveyor apparatus with counter-rotating molding capability. The fiber-reinforced, nanoporous gel composite can be mechanically rolled, with or without a porous flow layer, as shown in FIG. 1. FIG. 2 shows the same process utilizing a moving conveyor belt with only a single molding surface (a continuously rotating bottom belt with molded sides). FIG. 3 shows how monolithic gel sheets, formed from a polymer sol (without added fiber reinforcing structures) can be formed continuously by deposition of a catalyzed sol solution onto a moving conveyor, and FIG. 4 illustrates the same procedure except a counter-rotating conveyor molding strategy is shown. The sols utilized in this invention are mixed and prepared, often by co-mixing with a chemical catalyst, prior to deposition onto the moving conveyor as shown in the block diagram of FIG. 5. A related, but alternative embodiment of the invention process is shown in FIG. 6, in which a fiber and separator layer preform roll are infiltrated with a sol, and after initial gelation takes place, unrolled to separate the gel composite from the impermeable layer and subsequently re-rolled with a permeable layer to prepare for further chemical processing.

The gel matrix of the preferred precursor materials for the present invention may be organic, inorganic, or a mixture thereof. Sols can be catalyzed to induce gelation by methods known to those trained in the art: examples include adjusting the pH and/or temperature of a dilute metal oxide sol to a point where gelation occurs (The following are incorporated here by reference: R. K. Iler, Colloid Chemistry of Silica and Silicates, 1954, chapter 6; R. K. Iler, The Chemistry of Silica, 1979, chapter 5, C. J. Brinker and G. W. Scherer, Sol-Gel Science, 1990, chapters 2 and 3). Suitable materials for forming inorganic aerogels are oxides of most of the metals that can form oxides, such as silicon, aluminum, titanium, zirconium, hafnium, yttrium, vanadium, and the like. Particularly preferred are gels formed primarily from alcohol solutions of hydrolyzed silicate esters due to their ready availability and low cost (alcogel).

It is also well known to those trained in the art that organic aerogels can be made from organic polymer materials including polyacrylates, polystyrenes, polyacrylonitriles, polyurethanes, polyamides, EPDM and/or polybutadiene rubber solutions, polyimides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, agarose, and the like (see for instance C. S. Ashley, C. J. Brinker and D. M. Smith, Journal of Non-Crystalline Solids, volume 285, 2001).

Figure 7:
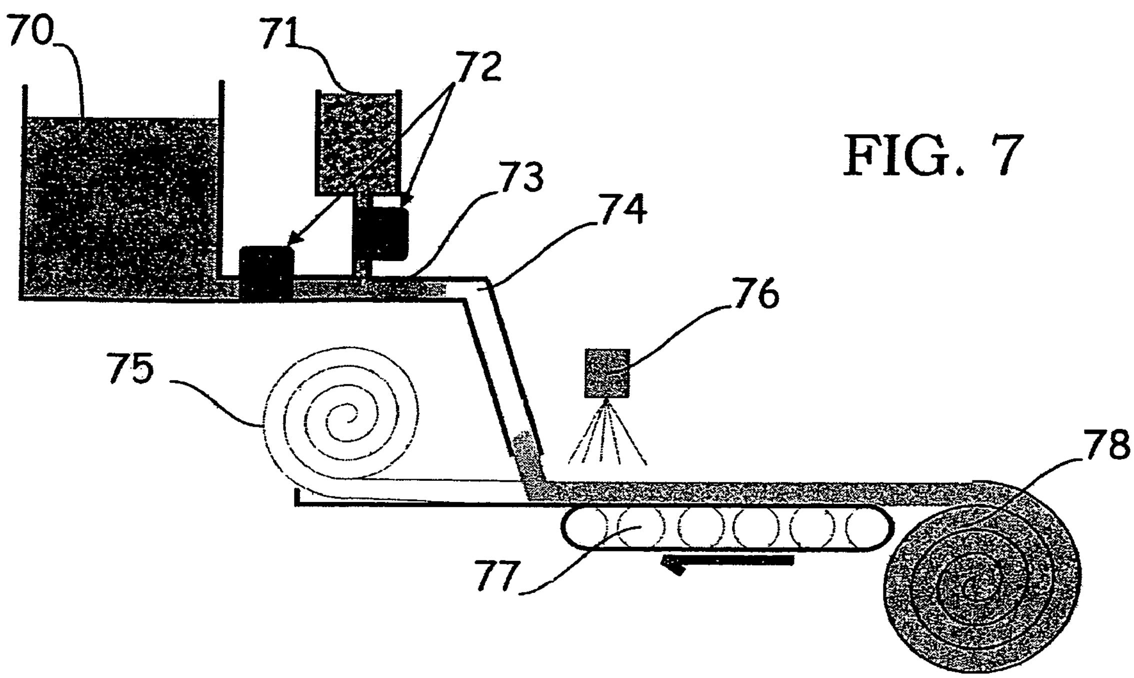
FIG. 7 illustrates an additional embodiment for producing gel sheet by inducing a gelation zone.

Various forms of electromagnetic, acoustic, or particle radiation sources can be used to induce gelation of sol precursor materials on the moving conveyor apparatus. The literature contains a number of examples wherein heat, ultrasonic energy, ultraviolet light, gamma radiation, electron beam radiation, and the like can be exposed to a sol material to induce gelation. The use of energy dissipation (heat, acoustic, radiation) into a fixed zone of the conveyor apparatus, such that a moving sol pool interacts with a controlled energy flux for a fixed period of time is advantageous to control the properties of the gel as well as the dried aerogel or xerogel material. This process is illustrated in FIG. 7.

Generally the principal synthetic route for the formation of an inorganic aerogel is the hydrolysis and condensation of an appropriate metal alkoxide. The most suitable metal alkoxides are those having about 1 to 6 carbon atoms, prefer-ably from 1–4 carbon atoms, in each alkyl group. Specific examples of such compounds include tetraethoxysilane (TEOS), tetramethoxysilane (TMOS), tetra-n-propoxysilane, aluminum isopropoxide, aluminum sec-butoxide, cerium isopropox-ide, hafnium tert-butoxide, magnesium aluminum isopropoxide, yttrium isopro-poxide, titanium isopropoxide, zirconium isopropoxide, and the like.

In the case of silica precursors, these materials can be partially hydrolyzed and stabilized at low pH as polymers of polysilicic acid esters such as polydiethoxysiloxane. These materials are commercially available in alcohol solution. Pre-polymerized silica precursors are especially preferred for the processing of gel materials described in this invention. Inducing gelation of metal oxide sols in alcohol solutions is referred to as the alcogel process in this disclosure.

It is understood to those trained in the art that gel materials formed using the sol-gel process can be derived from a wide variety of metal oxide or other polymer forming species. It is also well known that sols can be doped with solids (IR opacifiers, sintering retardants, microfibers) that influence the physical and mechanical properties of the gel product. Suitable amounts of such dopants generally range from about 1 to 40% by weight of the finished composite, preferably about 2 to 30% using the casting methods of this invention.

Major variables in the inorganic aerogel formation process include the type of alkoxide, solution pH, and alkoxide/alcohol/water ratio. Control of the variables can permit control of the growth and aggregation of the matrix species throughout the transition from the "sol" state to the "gel" state. While properties of the resulting aerogels are strongly affected by the pH of the precursor solution and the molar ratio of the reactants, any pH and any molar ratio that permits the formation of gels may be used in the present invention.

Generally, the solvent will be a lower alcohol, i.e. an alcohol having 1 to 6 carbon atoms, preferably 2 to 4, although other liquids can be used as is known in the art. Examples of other useful liquids include but are not limited to: ethyl acetate, ethyl acetoacetate, acetone, dichloromethane, and the like.

For convenience, the alcogel route of forming inorganic silica gels and composites are used below to illustrate how to create the precursors utilized by the invention, though this is not intended to limit the present invention to any specific type of gel. The invention is applicable to other gel compositions.

Alternatively, other sol preparation and gel induction methods can be utilized to make a precursor gel article using the processing methods of this invention, but the chemical approaches that allow for obtaining the lowest density and/or best thermally insulating articles are preferred. For example, a water soluble, basic metal oxide precursor can be neutralized by an aqueous acid in a continuous fashion, deposited onto a moving conveyor belt such as shown in FIGS. 1 and 2, and induced to make a hydrogel on the moving belt. Sodium silicate has been widely used as a hydrogel precursor. Salt by-products may be removed from the silicic acid precursor by ion-exchange and/or by washing subsequently formed gels with water after formation and mechanical manipulation of the gel.

After identification of the gel material to be prepared using the methods of this invention, a suitable metal alkoxide-alcohol solution is prepared. The preparation of aerogel-forming solutions is well known in the art. See, for example, S. J. Teichner et al, Inorganic Oxide Aerogel, Advances in Colloid and Interface Science, Vol. 5, 1976, pp 245–273, and L. D. LeMay, et al., Low-Density Microcellular Materials, MRS Bulletin, Vol. 15, 1990, p 19. For producing silica gel monoliths and fiber-reinforced containing silica gel composites useful in the manufacture of silica aerogel materials, typically preferred ingredients are tetraethoxysilane (TEOS), water, and ethanol (EtOH). The preferred ratio of TEOS to water is about 0.2–0.5:1, the preferred ratio of TEOS to EtOH is about 0.02–0.5:1, and the preferred pH is about 2 to 9. The natural pH of a solution of the ingredients is about 5. While any acid may be used to obtain a lower pH solution, HCl, $H_2SO_4$ or HF are currently the preferred acids. To generate a higher pH, $NH_4OH$ is the preferred base.

For the purposes of this patent, a lofty batting is defined as a fibrous material that shows the properties of bulk and some resilience (with or without full bulk recovery). The preferred form is a soft web of this material. The use of a lofty batting reinforcement material minimizes the volume of unsupported aerogel while avoiding substantial degradation of the thermal performance of the aerogel. Batting preferably refers to layers or sheets of a fibrous material, commonly used for lining quilts or for stuffing or packaging or as a blanket of thermal insulation.

Batting materials that have some tensile strength are advantageous for introduction to the conveyor casting system, but are not required. Load transfer mechanisms can be utilized in the process to introduce delicate batting materials to the conveyor region prior to infiltration with prepared sol flow.

Suitable fibrous materials for forming both the lofty batting and the x-y oriented tensile strengthening layers include any fiber-forming material. Particularly suitable materials include: fiberglass, quartz, polyester (PET), polyethylene, polypropylene, polybenzimid-azole (PBI), polyphenylenebenzo-bisoxasole (PBO), polyetherether ketone (PEEK), polyarylate, polyacrylate, polytetrafluoroethylene (PTFE), poly-metaphenylene diamine (Nomex), polyparaphenylene terephthalamide (Kevlar), ultra high molecular weight polyethylene (UHMWPE) e.g. Spectra™, novoloid resins (Kynol), polyacrylonitrile (PAN), PAN/carbon, and carbon fibers.

FIG. 1 illustrates a method that produces fiber reinforced gel sheets in a continuous or semi-continuous fashion utilizing a sol dispensing and catalyst mixing system and a counter-rotating conveyor belt mold apparatus. Gel composite sheets can be produced in rolled form if mechanically wound at the end of the belt. The internal figure numbers correspond as follows: 11 is a stable sol precursor solution, 12 is a catalyst to induce gelation of the sol when added in a proper quantity in controlled conditions, 13 indicates flow control positions, 14 is a static mixer, 15 is the position in the fluid mixing system wherein the sol has been mixed thoroughly with catalyst, 16 is a scraper/lubrication device (optional), 17 is a fibrous batting material (may come in discrete sheets or rolls that are fed into the assembly), 18 indicates two counter rotating belt assemblies that form molding surfaces along the length of which gelation occurs prior to the rolling assembly indicated by 19.

FIG. 2 illustrates a method that produces fiber reinforced gel sheets in a continuous or semi-continuous fashion utilizing a sol dispensing and catalyst mixing system and a single conveyor belt mold apparatus. Gel composite sheets can be produced in rolled form if mechanically wound at the end of the belt. The internal figure numbers correspond as follows: 21 is a stable sol precursor solution, 22 is a catalyst to induce gelation of the sol when added in a proper quantity in controlled conditions, 23 indicates flow control positions, 24 is a static mixer, 25 is the position in the fluid mixing system wherein the sol has been mixed thoroughly with catalyst, 26 is a scraper/lubrication device (optional), 27 is a fibrous batting material (may come in discrete sheets or rolls that are fed into the assembly), 28 indicates a conveyor belt assembly that forms a molding surface along the length of which gelation occurs prior to the rolling assembly indicated by 29.

FIG. 3 illustrates a method that produces gel sheets in a continuous or semi-continuous fashion utilizing a sol dispensing and catalyst mixing system and a counter-rotating conveyor belt mold apparatus. The internal figure numbers correspond as follows: 30 is a stable sol precursor solution, 31 is a catalyst to induce gelation of the sol when added in a proper quantity in controlled conditions, 32 indicates flow control positions, 33 is a static mixer, 34 and 35 are two counter rotating belt assemblies that form molding surfaces along the length of which gelation occurs prior to the gel sheet cutting assembly indicated by 36. Discrete gel sheets (37) are then ready for further processing.

FIG. 4 illustrates a method that produces gel sheets in a continuous or semi-continuous fashion utilizing a sol dispensing and catalyst mixing system and a conveyor belt mold apparatus. The internal figure numbers correspond as follows: 40 is a stable sol precursor solution, 41 is a catalyst to induce gelation of the sol when added in a proper quantity in controlled conditions, 42 indicates flow control positions, 43 is a static mixer, 44 is a conveyor belt mold along the length of which gelation occurs prior to the gel sheet cutting assembly indicated by 45. Discrete gel sheets (46) are then ready for further processing.

Figure 5:
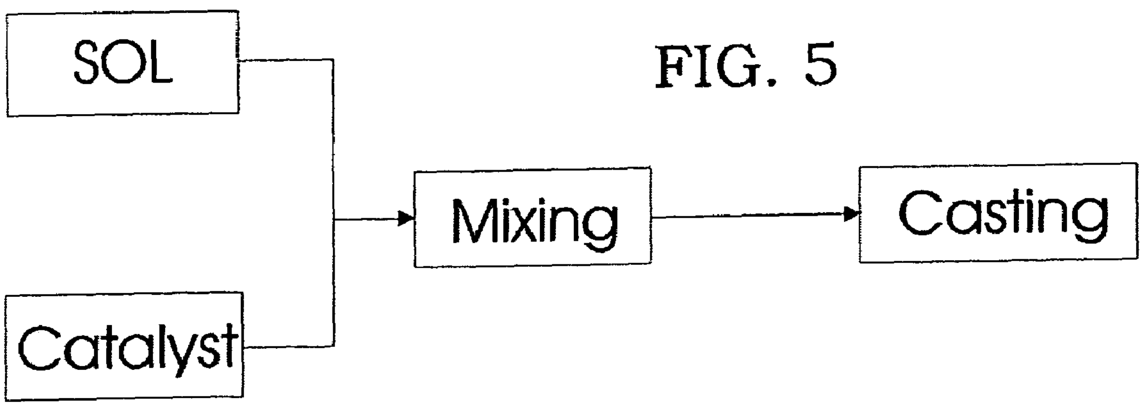
FIG. 5 illustrates the general flow diagram of catalyst-sol mixing prior to casting.
Figure 6:
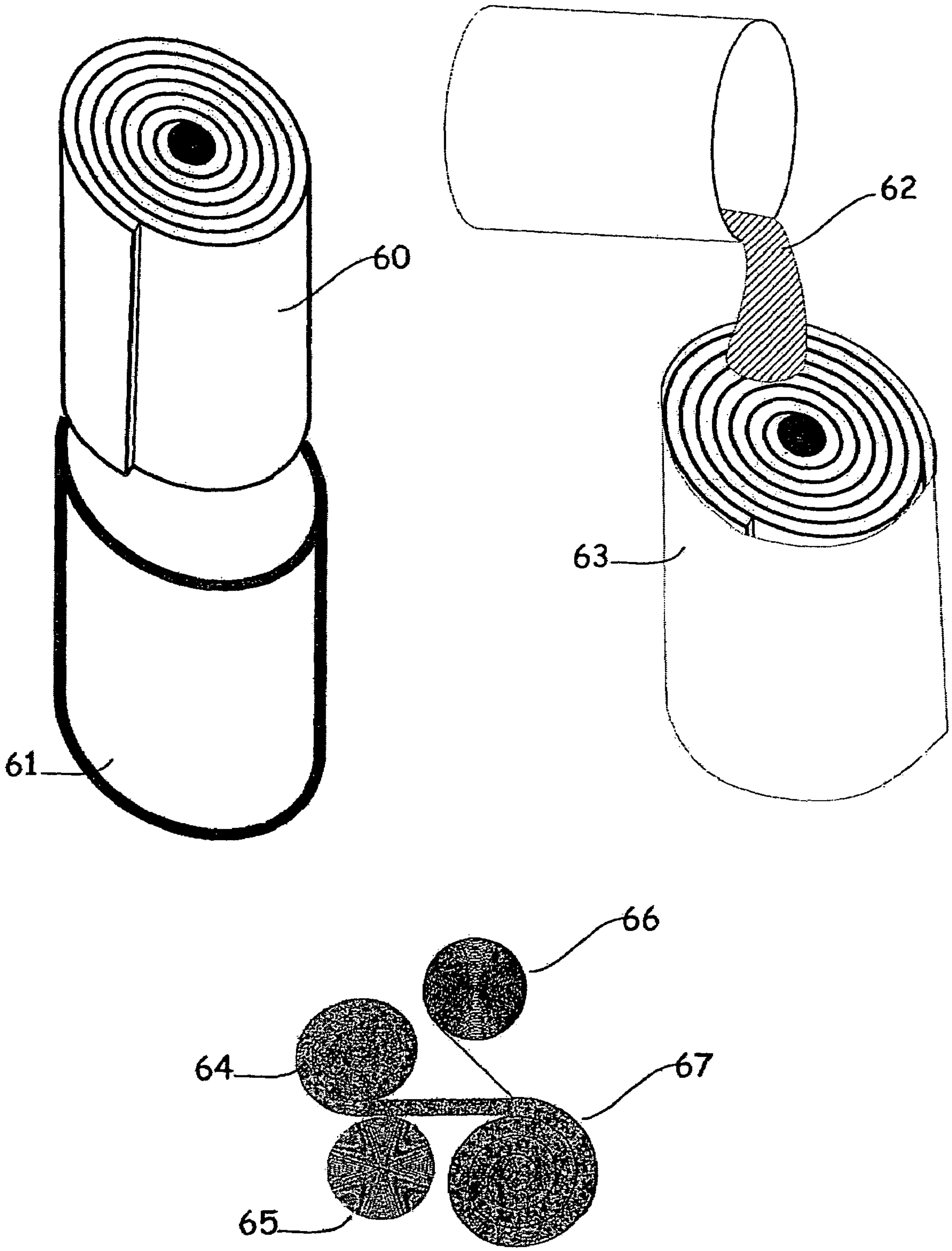
FIG. 6 illustrates an additional embodiment with dispensing the catalyzed sol to a preformed roll including spacer layers.

FIG. 5 illustrates the general flow diagram for mixing a sol and a catalyst in a mixing zone prior to casting (deposition) at a controlled rate onto a conveyor apparatus in a continuous fashion.

FIG. 6 illustrates an alternative casting method that involves a fiber and separator layer pre-form roll (60) in a container (61) being infiltrated with a sol (62), and after initial gelation takes place (63), unrolled (64) to separate the gel composite from the impermeable layer (65) and subsequently re-rolled with a permeable layer (66) to form a gel composite/flow layer roll (67) in order to prepare for further chemical processing. Alternatively, Sol infiltrated pre-form roll can be directly dried with separator layer present in it and unrolled.

FIG. 7 illustrates a method that produces fiber reinforced gel sheets in a continuous or semi-continuous fashion utilizing a sol dispensing system and a single conveyor belt mold apparatus. Gelation is induced in a designed zone of the conveyor apparatus by exposure of the sol to heat or radiation. The internal figure numbers correspond as follows: 70 is a stable sol precursor solution, 71 is a catalyst to induce gelation of the sol when added in a proper quantity in controlled conditions, 72 indicates flow control positions, 73 is a static mixer, 74 is the position in the fluid mixing system wherein the sol has been mixed thoroughly with catalyst, 75 is a fibrous batting material (may come in discrete sheets or rolls that are fed into the assembly), 76 is a device that dissipates energy into the sol or gel to alter its properties (e.g. inducing cross-linking), 77 indicates a conveyor belt assembly that forms a molding surface along the length of which gelation occurs prior to the rolling assembly indicated by 78.

Figure 8:
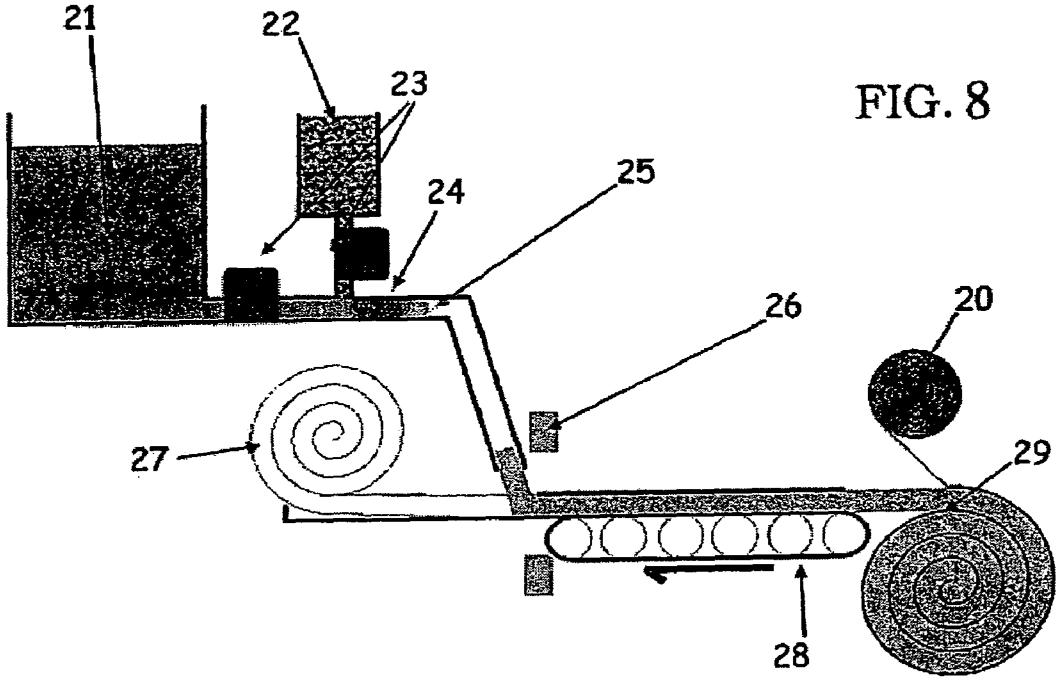
FIG. 8 illustrates an additional embodiment for producing gel sheets with one or more spacer layers.

FIG. 8 illustrates another embodiment of the present invention, where sol is dispensed onto a conveyer belt and allowed to gel as the conveyer belt travels a specific distance (corresponding to a specified residence time) and rolled onto a mandrel. While the gel sheet is rolled, a permeable spacer layer is co-rolled with the gel sheet such that any two layers of the gel sheets are separated by the spacer layer. Optionally this spacer could be impermeable. The rolled gel sheet assembly is further dried in a supercritical dryer. The spacer layer provides effective flow paths during the supercritical extraction/drying. If the impermeable spacer layer is used, it channels the flow of extraction fluid in axial direction. If the permeable spacer layer is used, an additional radial flow pattern is also obtained. Depending on the requirements arising from the composition of the gel sheet, impermeable or permeable spacer layer is used to provide the necessary flow patterns in the supercritical extractor/dryer.

Further details and explanation of the present invention may be found in the following specific examples, which describe the manufacture of the mechanically densified aerogel composites in accordance with the present invention and test results generated there from. All parts and percents are by weight unless otherwise specified.

EXAMPLE 1

Twenty gallons of silica sol produced by hydrolysis of a 20% TEOS solution in ethanol (at pH 2 at room temperature for 24 hours) is introduced into a stainless steel vessel equipped with a bottom drain connected to fluid pump and flow meter. A separate container also equipped with a bottom drain, pump, and flow meter is filled with an excess of ammoniated ethanol (1%). The two separate fluids are combined at a fixed ratio using the flow meters through a static mixer and deposited through a dispensing head onto a flat moving conyeyor surface. The conveyor belt has flexible edges welded to the surface (38" spacing is used in this example, but can be nearly any practical width), such that the dispensed sol is contained in volume. A pinch roller contacting the front surface of the moving conveyor belt prevents back diffusion of the low viscosity sol. The belt speed is adjusted such that the gelation front within the mixed sol (defined as the fixed position along the conveyor table at which the sol is no longer free flowing, taking on a rubbery quality) appears halfway along the length of the table. A ratio of gelation time to syneresis time of 1:1 is preferred, but can vary between 2:1 and 1:5 without problems. As the gelled sol reaches the end of the table, each silica gel plate is cut to size across the width and transferred on a load-bearing plate into an alcohol bath for further processing.

EXAMPLE 2

Twenty gallons of silica sol produced by hydrolysis of a 20% TEOS solution in ethanol (at pH 2 at room temperature for 24 hours) is introduced into a stainless steel vessel equipped with a bottom drain connected to fluid pump and flow meter. A separate container also equipped with a bottom drain, pump, and flow meter is filled with an excess of ammoniated ethanol (1%). The two separate fluids are combined at a fixed ratio using the flow meters through a static mixer and deposited through a dispensing head onto a flat moving conveyor surface (38" width between flexible edges). A roll of polyester batting (38 inches wide) approximately 0.5" thick is fed into the conveyor system at the same linear speed as the belt. A pinch roller contacting the front surface of the moving conveyor belt prevents back diffusion of the low viscosity sol, and another pinch roller in front of the sol deposition point is utilized to aid infiltration of the sol into the batting material. The belt speed is adjusted such that the gelation front within the mixed sol (defined as the fixed position along the conveyor table at which the sol is no longer free flowing, taking on a rubbery quality) appears halfway along the length of the table. A ratio of gelation time to syneresis time of 1:1 is preferred for flexible gel materials, but can vary between 2:1 and 1:2 without problems. As the gelled sol reaches the end of the table, the flexible gel composite is rolled onto a cylindrical mandrel. A perforated polyethylene mesh is used to maintain tension of the roll as it is formed. The roll is then ready for further chemical processing and can be transferred using the mandrel as a load-bearing instrument.

EXAMPLE 3

Twenty gallons of silica sol produced by hydrolysis of a 20% TEOS solution in ethanol (at pH 2 at room temperature for 24 hours) is introduced into a stainless steel vessel equipped with a bottom drain connected to fluid pump and flow meter. The silica sol is pumped at a fixed rate through a dispensing head onto a flat moving conveyor surface (38" width between flexible edges). A roll of polyester batting (38 inches wide) approximately 0.5" thick is fed into the conveyor system at the same linear speed as the belt, prior to the sol deposition point. A pinch roller contacting the front surface of the moving conveyor belt prevents back diffusion of the low viscosity sol, and another pinch roller in front of the sol deposition point is utilized to aid infiltration of the sol into the batting material. Arrays of ultrasound transducers coupled to the bottom of the belt through a lubricating gel are arranged at the midway point of the conveyor apparatus. The belt speed and ultrasonic power and frequency are adjusted such that the gelation front within the mixed sol appears approximately halfway along the length of the table. As the gelled sol reaches the end of the table, the flexible gel composite is rolled onto a cylindrical mandrel. A perforated polyethylene mesh is used to maintain tension of the roll as it is formed. The roll is then ready for further chemical processing and can be transferred using the mandrel as a load-bearing instrument.

EXAMPLE 4

Twenty gallons of silica sol produced by hydrolysis of a 20% tetramethylorthosilicate (TMOS) solution in methanol (at pH 2 at room temperature for 4 hours) is introduced into a stainless steel vessel equipped with a bottom drain connected to fluid pump and flow meter. A separate container also equipped with a bottom drain, pump, and flow meter is filled with an excess of ammoniated methanol (1%). The two separate fluids are combined at a fixed ratio using the flow meters through a static mixer and deposited through a dispensing head onto a flat moving conveyor surface. The silica sol is pumped at a fixed rate through a dispensing head onto a flat moving conveyor surface (38" width between flexible edges). A pinch roller contacting the front surface of the moving conveyor belt prevents back diffusion of the low viscosity sol. The conveyor belt speed and sol deposition flow rate are matched such that the gelation front for the (monolithic) silica gel sheet occurs approximately half way along the length of the conveyor. The belt speed is kept constant during the process to ensure that the ratio of syneresis time and gel time is approximately 1:1. As the aged silica gel sheet reaches a preferred length beyond the end of the conveyor belt (on a supporting surface to prevent cracking of the delicate gel structure), a cutting apparatus is engaged to separate the individual piece from the continuously moving gel. The new gel sheet is moved onto a load bearing plate and removed to another area for further treatment. This action is repeated until all of the sol has been deposited on the table. This process can be run continuously as long as appropriately formulated sol is replenished into the deposition apparatus.

EXAMPLE 5

Twenty gallons of silica sol produced by hydrolysis of a 20% TEOS solution in ethanol (at pH 2 at room temperature for 24 hours) is introduced into a stainless steel vessel equipped with a bottom drain connected to fluid pump and flow meter. Ammoniated ethanol (1%) is added with stirring at a rate that maintains a near constant temperature until the pH of the sol reaches a value between 4 and 7. The pH adjusted ("catalyzed") sol is deposited into a container through a roll of polyester batting (38 inches wide) approximately 0.5" thick that has been wound on a stainless steel mandrel with a polyethylene separator layer. The deposition is conducted in a fashion that prevents excessive formation of air bubbles within the fiber volume, and can benefit from the use of resin transfer molding techniques or vacuum infiltration techniques known to those trained in the art. After gelation has occurred, the gel roll is unrolled prior to excessive stiffening (a ratio of gelation time to syneresis time of greater than 1:1 is preferred) wherein the impermeable plastic layer is removed and the flexible gel re-rolled with a permeable flow layer with appropriate tension into a separate canister (FIG. 6). The gelled roll is then ready for further aging and chemical processing prior to supercritical drying.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Moreover, while this invention has been shown and described with references to particular embodiments thereof, those skilled in the art will understand that various other changes in form and details may be made therein without departing from the scope of the invention.

What is claimed is:

1. A process for casting gel sheets, comprising the steps of:

providing a quantity of fibrous batting material;

introducing a quantity of impermeable material to separate the quantity of fibrous batting material into a fiber-roll preform having a plurality of fibrous layers;

infusing a quantity of catalyzed sol into the fiber-roll preform;

gelling the catalyzed sol in the fiber-roll preform;

removing the impermeable material to leave remaining a gel material;

introducing a quantity of permeable material to separate the gel material into a plurality of layers.

2. The process of claim 1, wherein the catalyzed sol comprises a material selected from the group consisting of inorganic materials, organic materials, and a combination of the inorganic materials and the organic materials.

3. The process of claim 2, wherein the inorganic materials are selected from the group consisting of zirconia, yttria, hafnia, alumina, titania, ceria, and silica, magnesium oxide, calcium oxide, magnesium fluoride, calcium fluoride, and combinations thereof.

4. The process of claim 2, wherein the organic materials are selected from the group consisting of polyacrylates, polyolefms, polystyrenes, polyacrylonitriles, polyurethanes, polyimides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, and agarose, and combinations thereof.

5. The process of claim 1, wherein the fibrous batting material comprises a material selected from the group consisting of inorganic materials, organic materials, and a combination of the inorganic materials and the organic materials.

6. The process of claim 5, wherein the inorganic materials are selected from the group consisting of zirconia, yttria, hafnia, alumina, titania, ceria, and silica, magnesium oxide, calcium oxide, magnesium fluoride, calcium fluoride, and combinations thereof.

7. The process of claim 5, wherein the organic materials are selected from the group consisting of polyacrylates, polyolefins, polystyrenes, polyacrylonitriles, polyurethanes, polyimides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, and agarose, and combinations thereof.

8. The process of claim 1, wherein the fibrous batting material includes fibers having a diameter within a range of about 0.1 $\mu$m to 10,000 $\mu$m.

9. The process of claim 1, wherein the fibrous batting material includes fibers having a diameter within a range of about 0.001 $\mu$m to 10 $\mu$m.

10. The process of claim 1, further comprising the step of: distributing crimped fibers throughout the gel material.

11. The process of claim 1, wherein gelation of the catalyzed sol is enhanced by a process selected from the group consisting of (a) a chemical process, and (b) dissipating a predetermined quantity of energy from an energy source into a cross-sectional area of the sol.

12. The process of claim 1, wherein the impermeable material is comprised of a flexible sheet.

13. The process of claim 1, wherein the gel material has a form selected from the group consisting of a mesh, a sheet, a perforated sheet, a foil, and a perforated foil.

14. A process for manufacturing aerogel blankets, comprising the steps of:

providing a quantity of fibrous batting material;

introducing a quantity of impermeable material to separate the quantity of fibrous batting material into a fiber-roll preform having a plurality of fibrous layers;

infusing a quantity of catalyzed sol into the fiber-roll preform;

gelling the catalyzed sol in the fiber-roll preform to form a gel sheet roll; and drying the gel sheet roll.

15. A process for preparing gel sheets, comprising the steps of:

dispensing a catalyzed sol onto a moving element as a continuous sheet;

rolling the dispensed sheet into a plurality of layers.

16. The process of claim 15, further comprising the step of:

providing a spacer layer between any two predetermined layers of the continuous sheet.

17. The process of claim 16, wherein the spacer layer is permeable.

18. The process of claim 16, wherein the spacer layer is impermeable.

19. The process of claim 17, wherein the permeable spacer layer is effective to provide radial flow patterns in connection with a drying process.

20. The process of claim 18, wherein the impermeable spacer layer is effective to provide axial flow pattern in connection with a drying process.

* * * * *